United States Patent
Didomenico

(10) Patent No.: US 10,840,587 B2
(45) Date of Patent: Nov. 17, 2020

(54) ANTENNA FOR RAILWAY VEHICLES

(71) Applicant: ALSTOM Transport Technologies, Saint-Ouen (FR)

(72) Inventor: Dale Didomenico, Indialantic, FL (US)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 7 days.

(21) Appl. No.: 16/298,693

(22) Filed: Mar. 11, 2019

(65) Prior Publication Data
US 2020/0295442 A1 Sep. 17, 2020

(51) Int. Cl.
| | |
|---|---|
| H01Q 1/32 | (2006.01) |
| H01Q 15/00 | (2006.01) |
| H01Q 1/48 | (2006.01) |
| H01Q 9/16 | (2006.01) |
| H01Q 19/10 | (2006.01) |
| H04B 7/26 | (2006.01) |

(52) U.S. Cl.
CPC ......... *H01Q 1/3275* (2013.01); *H01Q 1/3216* (2013.01); *H01Q 1/48* (2013.01); *H01Q 9/16* (2013.01); *H01Q 15/0006* (2013.01); *H01Q 15/006* (2013.01); *H01Q 19/10* (2013.01); *H04B 7/26* (2013.01)

(58) Field of Classification Search
CPC .......... H01Q 1/3275; H01Q 1/48; H01Q 9/16; H01Q 19/10; H01Q 15/006; H01Q 1/38; H01Q 15/14; H01Q 19/108; H01Q 15/0006; H01Q 1/3216; H04B 7/26; H01P 1/2005
See application file for complete search history.

(56) References Cited

U.S. PATENT DOCUMENTS

| | | | | |
|---|---|---|---|---|
| 5,689,275 A | * | 11/1997 | Moore | H01Q 3/2676 343/772 |
| 6,274,293 B1 | * | 8/2001 | Gupta | B82Y 20/00 427/124 |
| 6,469,682 B1 | * | 10/2002 | de Maagt | B82Y 20/00 343/909 |
| 6,518,930 B2 | * | 2/2003 | Itoh | H01Q 1/38 343/700 MS |
| 6,567,057 B1 | * | 5/2003 | Sievenpiper | H01Q 1/12 343/756 |
| 6,593,894 B1 | * | 7/2003 | Biswas | H01Q 15/006 343/789 |
| 6,842,149 B2 | * | 1/2005 | Taubman | H01Q 1/526 343/702 |
| 7,071,889 B2 | * | 7/2006 | McKinzie, III | H01Q 9/0421 343/700 MS |
| 7,692,516 B2 | * | 4/2010 | Kim | H01P 1/2005 333/138 |

(Continued)

*Primary Examiner* — Vibol Tan
(74) *Attorney, Agent, or Firm* — Nixon & Vanderhye

(57) ABSTRACT

Antenna (1) for railway vehicles comprising:
a plurality of photonic band gaps PGB cells (2), placed adjacent each other and made of a layer of low dielectric properties material placed on a metal ground plane (4), wherein each photonic band gap cell (2) form a reflector (6) of the antenna (1);
a plurality of first metallic bars (8), placed on top of the PBG cells (2);
a plurality of second metallic bars (10), each embedded, at least partially, in the thickness of the low dielectric properties material;
wherein the second metallic bars (10) are each roughly perpendicular to the respective reflector (6).

20 Claims, 3 Drawing Sheets

(56) References Cited

U.S. PATENT DOCUMENTS

| | | | | |
|---|---|---|---|---|
| 8,451,189 | B1* | 5/2013 | Fluhler | H01Q 15/0086 |
| | | | | 343/756 |
| 9,397,406 | B2* | 7/2016 | Grange | H01F 10/3218 |
| 9,407,011 | B2* | 8/2016 | Zaghloul | H01Q 19/10 |
| 9,444,147 | B2* | 9/2016 | Zaghloul | H01Q 19/10 |
| 9,570,814 | B2* | 2/2017 | Ando | H01Q 9/30 |
| 2003/0142036 | A1* | 7/2003 | Wilhelm | H01Q 1/36 |
| | | | | 343/909 |
| 2009/0303128 | A1* | 12/2009 | Robert | H01Q 9/0407 |
| | | | | 342/373 |
| 2013/0285880 | A1* | 10/2013 | Zaghloul | H01Q 15/006 |
| | | | | 343/912 |

* cited by examiner

ANTENNA FOR RAILWAY VEHICLES

BACKGROUND OF THE INVENTION

Field of the Invention

The present invention relates to an antenna for railway vehicles, in particular for the automatic detection of collision, derailment and other rail hazards using remote sensing in rail field applications on configurable platforms such as locomotives, or using Miniature Aerial Vehicles (MAV) technology.

The present invention relates also to a railway vehicle comprising such an antenna.

Description of the Related Art

Nowadays, the antennas placed on railway vehicles communicate at 250 MHz at a distance of about 4-5 miles. These antennas are for example the known Yagi antenna, and they have dimensions of about 1 meter.

This means that, with the existing antennas, the railway stations installed along the railway track to communicate with the railway vehicle have to be placed at least every 5 miles.

In order to decrease the number of stations it would be necessary to increase the distance between stations, and the antennas on the railway vehicles should be able to communicate at higher distances.

With a Yagi standard design this would imply using huge antennas, for example, for a target frequency of 1-2 MHz, about 200 feets in length with a weight of several thousand pounds, and this is of course not possible.

There is therefore the need to provide an innovative antenna for railway vehicles capable of being installed on railway vehicles and capable of transmitting and receiving data over hundreds miles. There is also the need to have railway vehicles having an antenna capable of transmitting and receiving data over hundreds miles.

SUMMARY OF THE INVENTION

These and other objects are fully achieved by virtue of an antenna for railway vehicles having the characteristics defined in independent claim 1, and by virtue of a railway vehicle according to claim 9.

Preferred embodiments of the invention are specified in the dependent claims, whose subject-matter is to be understood as forming an integral part of the present description.

BRIEF DESCRIPTION OF THE DRAWINGS

Further characteristics and advantages of the present invention will become apparent from the following description, provided merely by way of a non-limiting example, with reference to the enclosed drawings, in which.

DESCRIPTION OF THE PREFERRED EMBODIMENTS

The antenna of the present invention is able to communicate on a range between 2.5 MHz and 250 MHz, and at a distance of about 100 miles. On the contrary, a standard Yagi antenna is only able to communicate at one fixed frequency, and if this fixed frequency would be 2.5 MHz, a Yagi antenna would be huge.

The antenna of the present invention exceeds prior art Yagi antennas used for example for broken rail detection applications, and it greatly expands the overall range and bandwidth of the resulting antenna, while providing at the same time a low cost and light weight design.

In particular, the antenna of the present invention couples the energy emitted by adjacent radiator elements contributing to a more efficient and stronger wave front energy over the target bandwidth. This coupled energy is summed and launched to aid in the construction of a resultant beam based on a beam forming algorithm which turns on and off these radiator elements using a repetitive time slotted approach for each element, for obtaining maximum gain and an unwanted surface energy interference.

Advantageously, the antenna of the present invention expands the range with respect to the one of prior art antennas of ten-fold.

The antenna of the present invention is based on an array structure which creates a longer wave front in the propagation space, starting from an original smaller wave front (higher excitation frequency).

More specifically, the new longer wave front can be constructed in the far field proximity of the antenna and it is capable of traveling 100-200 times with respect to the range of the original excitation frequency.

Figure 1:
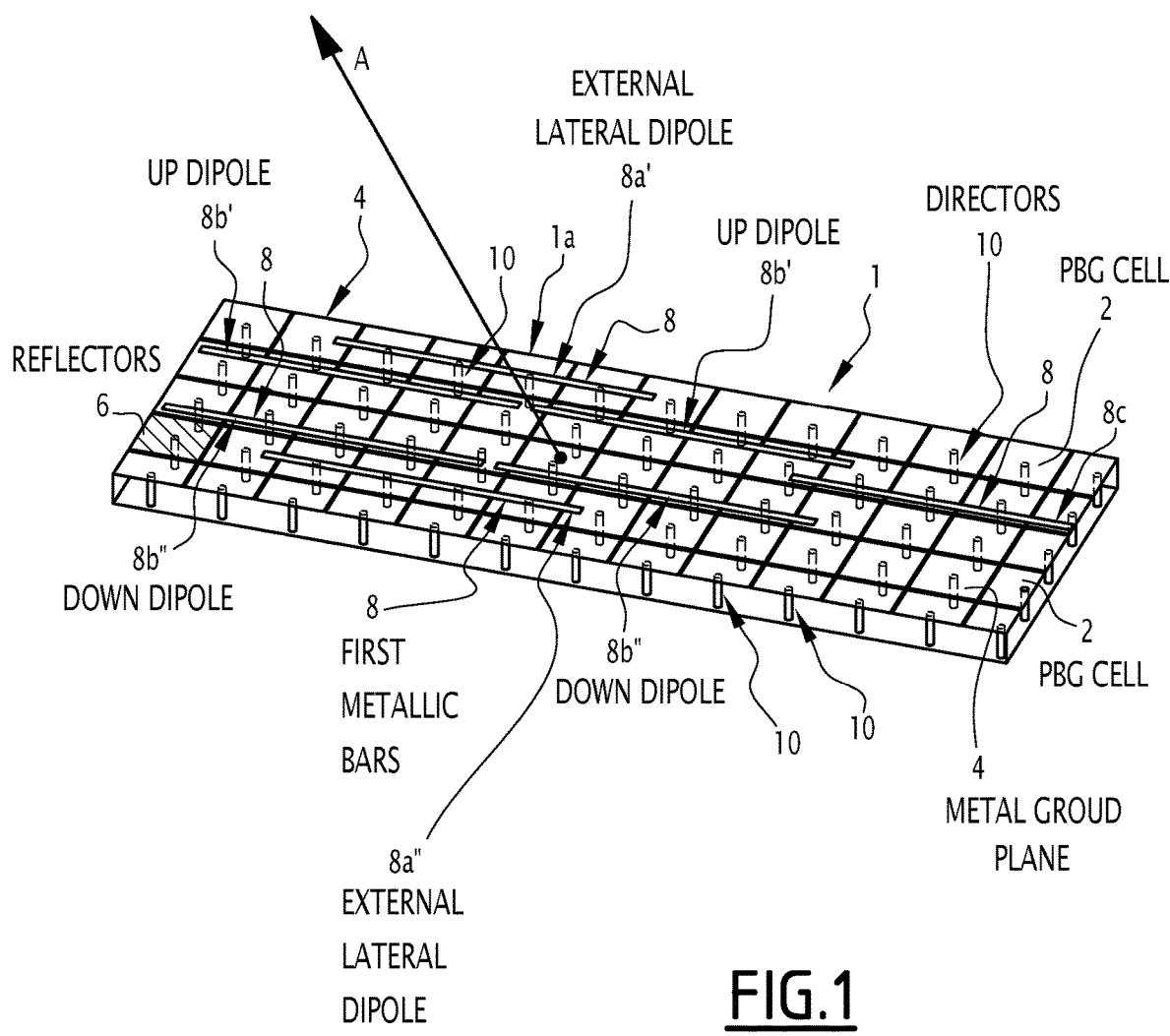
FIG. 1 shows a perspective view of an antenna according to the present invention.

FIG. 1 shows a perspective view of an antenna 1 according to the present invention, which has a Wavelet PBG (Photonic Band Gap) structure. The topology of the antenna 1 has been realized via simulation and comprises a plurality of PBG cells 2.

The PBG cells 2 are made of a layer of low dielectric properties material which reduces significantly the surface waves generated by the antenna 1 and promotes high antenna gain, bandwidth and efficiency. The dielectric layer is placed on a metal ground plane 4.

The PBG structure of the antenna 1 comprises, in a manner per se known, several substrate layers (not shown in the figure) including Teflon, Arlon and Rohacell HF-71 foam. These substrate layers represent altogether the low dielectric properties material cited here above.

On top of the PGB structure there are a plurality of first metallic bars 8, which represent the dipoles of the antenna 1. Preferably, there are seven dipoles 8 including two external lateral dipoles 8a', 8a" placed on a left side with respect to the length of the antenna 1, near a respective edge 1a of the antenna 1, four internal dipoles placed in a region comprised between said external lateral dipoles, in particular two up dipoles 8b' facing a first external lateral dipole 8a', and two down dipoles 8b" facing a second external lateral dipole 8a", and a central dipole 8c placed in a region comprised between the two up dipoles 8b' and the two down dipoles 8b", on a right side with respect to the length of the antenna 1.

Preferably, each dipole 8 comprises two radiating elements.

The antenna 1 of the present invention reproduces the structure of a standard Yagi antenna and therefore it further includes directors 10, which are second metallic bars each embedded in the thickness of the low dielectric properties material.

Each PBG cell 2, including both the dielectric layer and the metal ground plane 4 placed underneath, represents per se a reflector 6. The primary functions of the PBG cell 2 design is to reduce the surface wave energy that may interfere with a primary field launch of the radiators at a target frequency, and provide a large bandwidth of operation to band reject interfering harmonics generated by the transmitter while providing a reciprocal function of rejecting reception interference within the same bandwidth.

The reflectors 6 act like a divider in the frequency wave form.

The major difference with a standard Yagi antenna is that the directors 10, which are parasitic elements of the antenna 1, are not parallel to the reflectors 6 and placed in the opposite direction with respect to the reflectors 6, but they are each perpendicular to the respective reflector 6 and each placed between the dipoles 8 and the ground plane 4.

The antenna 1 is configured to generate a low frequency wave in a direction A for example perpendicular to the reflectors.

The gap spacing of the PBG cells 2, the properties of the dipoles 8 (bandwidth, band rejection and coupling), and the connections between the PBG cells 2 and the metal ground plane 4 are chosen in a manner per se known to minimize the losses and maximize the gain, the bandwidth and the directivity of the antenna 1.

The parasitic part of the antenna 1, which provides the energy coupling and the induction, is represented by the gap spaces between the PBG cells 2. A metal layer placed on top of the the PBG cells 2 (not shown in the figure) provides surface wave reflection traps via the metal ground plane 4 of the bottom metallization, to which it is connected in a manner per se known.

The spacing between the dipoles 8 and the orientation of said dipoles 8 provide the directivity factor of the antenna 1.

The antenna 1 of the present invention operates by transmitting each dipole 8 in burst mode transmission round robin, as here below explained.

The round robin approach, which is per se known, describes a beam former algorithm used for timing the launch of each dipole 8, for the construction of a proper wave front. Round robin specifies how each dipole 8 is individually turned on and off, going from one dipole 8 to the next and then repeating.

The coupled energy is summed and launched to aid in the construction of a resultant beam based on turning on and off these dipoles 8 in a repetitive time slotted approach for each dipole 8, for obtaining a maximum gain and unwanted surface energy interference. The timing of each dipole 8, i.e. when it is on and off, is directly associated with the wavelength needed to construct an overall new lower frequency with larger wavelength in the propagation space. Hence, a wavelet (a launched wavelength) is formed where smaller wavelets at higher frequency add each other to construct a larger wavelet in the propagation space, as they couple the induced current from each launch to a resultant lower frequency, larger wavelet with larger wavelength.

The transmission performed as here above disclosed creates a long wave front in the propagation space, preferably formed within ten wavelengths from a launch point of the antenna 1 at the start of the far field.

The radiated design of each dipole 8 is at 250 MHz, i.e. each dipole is arranged to emit a wavelength at 250 MHz, but the wavelength generated in the propagation space can be one hundred-fold less (i.e. 2.5 MHz), thus increasing the antenna range. Instead of tens of miles, the antenna 1 of the present invention can reach hundreds of miles, but the size and the weight of the antenna 1 is consistent with an antenna designed at 250 MHz, i.e. very small and light.

The antenna 1 shows a surface wave reduction, which minimizes the losses and maximizes its gain, bandwidth and directivity.

Figure 2:
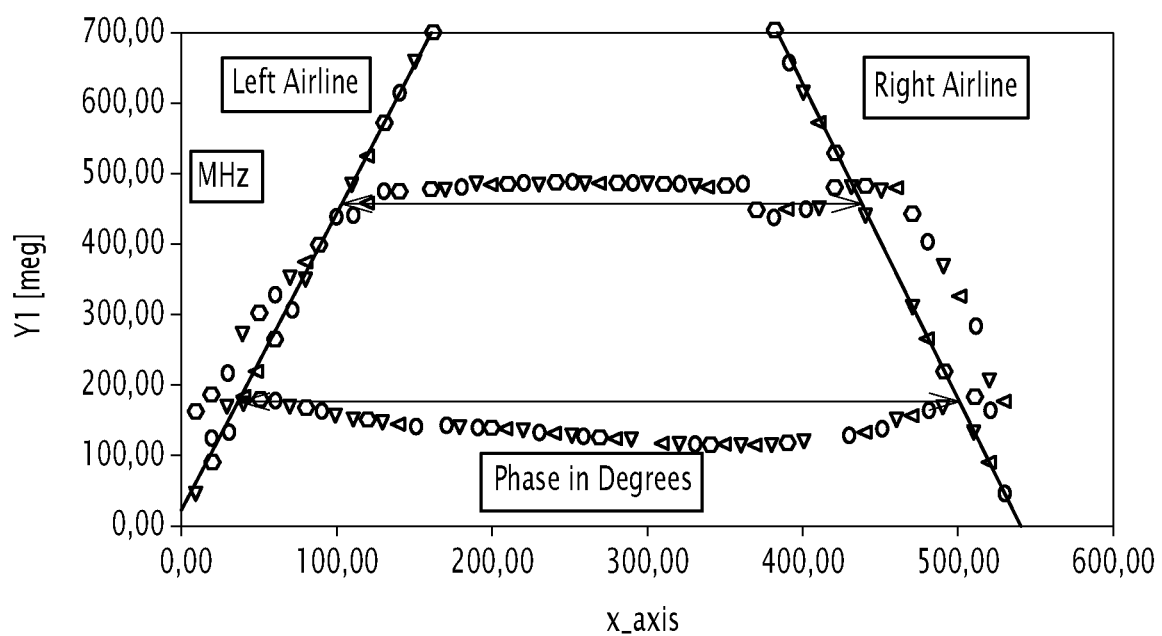
FIG. 2 shows a graph of the transmission modes of a PBG cell of the antenna according to the present invention.

FIG. 2 shows a graph of the transmission modes TMZ (Transverse Magnetic in Z plane) of a PBG cell 2 of an antenna according to the present invention, and includes the two dominant modes TMZ (010) (left airline) and TMZ (100) (right airline), which are shown from 0 to 540 degrees of phase on the x axis. As shown in FIG. 2, a band gap occurs between the two modes from 180 MHz to 420 MHz.

The PBG cell 2 which originates the modes of FIG. 2 is optimized to conform to a predetermined bandgap requirement of 180-420 MHz. The bandgap ensures that all surface waves in this frequency region are rejected thereby drastically improving propagation efficiency and improved antenna gain The PBG cell 2, which originates the modes of FIG. 2, comprises Arlon 25N as dielectric properties material, this material having a relative dielectric constant of 3.27 which is stable with high bandwidth. The substrate thickness for the PBG cell 2 is for example 2.6 inches, with a gap separation with respect to neighboring PBG cells 2 of 236 mils. The length of the dipole 8 suited for an initial 250 MHz launch is for example 22 inches, with width of 590 mils. Using these constraints, a plurality of PBG cells 2 forming the antenna of the present invention creates a wave front of 1 MHz in the far field after an initial excitation.

The antenna of the present invention is suitable for new applications needing extended range and/or higher altitude ground coverage, with limited size and weight. In addition, the antenna of the present invention allows getting longer range between antenna towers, so that fewer towers along railway lines are needed.

Figure 3:
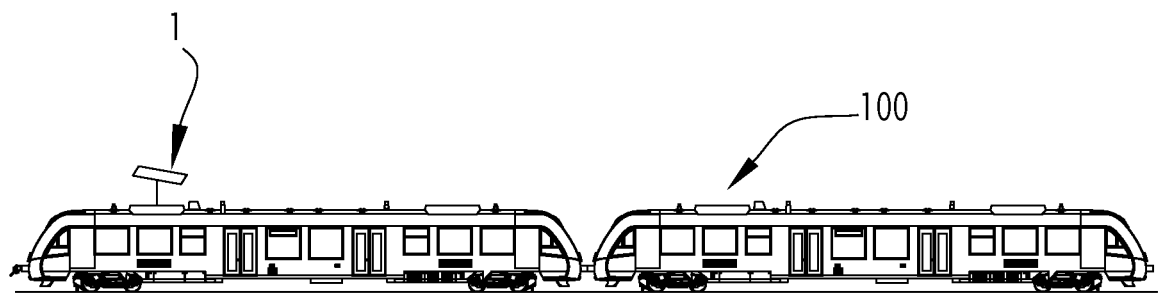
FIG. 3 shows a railway vehicle having an antenna according to the present invention installed on the roof.

The antenna of the present invention is suitable of being installed on railway vehicles, in particular on the roof of such vehicles. FIG. 3 shows a railway vehicle 100 having the antenna 1 on its roof.

In particular, the antenna of the present invention needs 180 degrees of beam width, therefore, it can be mounted on the roof with the dipoles 8 facing the direction of a railway vehicle movement, for example.

Example of applications of the antenna of the present invention include wayside installation, calibration, maintenance, troubleshooting and failure prediction systems, which allow reducing man resources and improving product capabilities with more efficiency.

The uniqueness of the antenna of the present invention is that it allows achieving communication ranges around hundreds of miles due to its unique design structure using combined hybrid wavelet and photonic band gap technologies.

The antenna of the present invention is low cost, light weight, high gain and broadband, low power and long range.

Clearly, the principle of the invention remaining the same, the embodiments and the details of production can be varied considerably from what has been described and illustrated purely by way of non-limiting example, without departing from the scope of protection of the present invention as defined by the attached claims.

The invention claimed is:
1. Antenna (1) for railway vehicles comprising:
a plurality of photonic band gaps PGB cells (2), placed adjacent each other and made of a layer of low dielectric properties material placed on a metal ground plane (4), wherein each photonic band gap cell (2) form a reflector (6) of the antenna (1);

a plurality of first metallic bars (8), placed on top of the PBG cells (2);

a plurality of second metallic bars (10), each embedded, at least partially, in the thickness of the low dielectric properties material;

wherein the second metallic bars (10) are each roughly perpendicular to the respective reflector (6).

2. The antenna of claim 1, wherein the second metallic bars (10) are each placed between the first metallic bars (8) and the metal ground plane (4).

3. The antenna of claim 1, wherein the antenna (1) is configured to generate a low frequency wave, notably in a direction (A) perpendicular to the reflectors.

4. The antenna of claim 1, wherein the first metallic bars (8) are seven including a first and a second external lateral metallic bars (8*a*) placed on a left side with respect to the length of the antenna (1), near the edge of the antenna (1), four internal metallic bars placed in a region comprised between the first and second external lateral metallic bars (8*a*) comprising two up metallic bars (8*b*') facing the first external lateral metallic bar (8*a*') and two down metallic bars (8*b*") facing the second external lateral metallic bar (8*a*"), and a central metallic bar (8*c*) placed in a region comprised between the two up metallic bars (8*b*') and the two down metallic bars (8*b*"), on a right side with respect to the length of the antenna (1).

5. The antenna of claim 1, wherein each first metallic bar (8) comprises two radiators.

6. The antenna of claim 1, arranged to operate by transmitting each first metallic bar (8) in a burst mode transmission round robin.

7. The antenna of claim 1, wherein each first metallic bar (8) is arranged to emit a wavelength at 250 MHz.

8. The antenna of claim 7, arranged to emit in a propagation space a low frequency wavelength of 2.5 MHz.

9. The antenna of claim 1, wherein the low dielectric properties material comprises Arlon 25N.

10. Railway vehicle (100) comprising an antenna according to claim 1.

11. Railway vehicle (100) according to claim 10, wherein the antenna is mounted on a roof of the railway vehicle (100) with the first metallic bars (8) advantageously facing the direction of the railway vehicle movement.

12. Railway vehicle comprising an antenna according to claim 2.

13. Railway vehicle comprising an antenna according to claim 3.

14. Railway vehicle comprising an antenna according to claim 4.

15. Railway vehicle comprising an antenna according to claim 5.

16. Railway vehicle comprising an antenna according to claim 6.

17. Railway vehicle comprising an antenna according to claim 7.

18. Railway vehicle comprising an antenna according to claim 8.

19. Railway vehicle comprising an antenna according to claim 9.

20. Railway vehicle according to claim 12, wherein the antenna is mounted on a roof of the railway vehicle with the first metallic bars advantageously facing the direction of the railway vehicle movement.

* * * * *